United States Patent
Huang et al.

(10) Patent No.: US 11,245,711 B2
(45) Date of Patent: Feb. 8, 2022

(54) NETWORK DATA TIMELINE

(71) Applicant: Anomali Inc., Redwood City, CA (US)

(72) Inventors: Wei Huang, Los Altos Hills, CA (US);
Yizheng Zhou, San Mateo, CA (US);
Peizhou Guo, Cupertino, CA (US);
Mohsen Imani, Redwood City, CA (US)

(73) Assignee: Anomali Inc., Redwood City, CA (US)

( * ) Notice: Subject to any disclaimer, the term of this patent is extended or adjusted under 35 U.S.C. 154(b) by 270 days.

(21) Appl. No.: 16/838,991

(22) Filed: Apr. 2, 2020

(65) Prior Publication Data

US 2020/0322363 A1 Oct. 8, 2020

Related U.S. Application Data

(60) Provisional application No. 62/830,238, filed on Apr. 5, 2019.

(51) Int. Cl.
| | |
|---|---|
| *G06F 15/173* | (2006.01) |
| *H04L 29/06* | (2006.01) |
| *H04L 29/08* | (2006.01) |
| *H04L 12/26* | (2006.01) |
| *G06F 16/22* | (2019.01) |

(52) U.S. Cl.
CPC ...... *H04L 63/1416* (2013.01); *G06F 16/2228* (2019.01); *H04L 43/08* (2013.01); *H04L 43/16* (2013.01); *H04L 63/1425* (2013.01); *H04L 67/141* (2013.01)

(58) Field of Classification Search
CPC . H04L 63/1416; H04L 63/1425; H04L 43/08; H04L 43/16; H04L 67/141; G06F 16/2228
See application file for complete search history.

(56) References Cited

U.S. PATENT DOCUMENTS

2004/0199535 A1* 10/2004 Zuk .................. H04L 63/1425

* cited by examiner

*Primary Examiner* — Wing F Chan
*Assistant Examiner* — Joseph R Maniwang
(74) *Attorney, Agent, or Firm* — Fenwick & West LLP

(57) ABSTRACT

A system and a method are disclosed for describing a mechanism for tracking malicious activity detected on a network. For example, based on network data collected from a server, the disclosed system may detect malicious activity originating from a client device directed to the server. To detect the malicious activity, network data may be captured by the server and analyzed. When malicious activity is detected, the system may track the malicious activity, using the network data, to an earliest connection date of a client device from where the malicious activity potentially originated. The earliest connection date may indicate a potential start date of the malicious activity.

20 Claims, 15 Drawing Sheets

500:

NETWORK DATA TIMELINE

CROSS REFERENCE TO RELATED APPLICATIONS

This application claims the benefit of U.S. Provisional Application No. 62/830,238, filed Apr. 5, 2019, which is incorporated by reference in its entirety.

TECHNICAL FIELD

The disclosure generally relates to the field of network security, and more particularly to detecting malicious activity on a network.

BACKGROUND

Certain network scanning services provide real-time search engines that enable customers to run queries against the most recent network data available to identify network breaches. However, these services do not provide a historical perspective of network activity, which may provide more insights into network traffic and malware behavior. For example, historical data can help tracking network breaches to the original time the breach occurred. However, tracking is not presently done because analyzing historical data is difficult and inefficient in many cases because the amount of data is generally large (e.g., sometimes in the order of petabytes). Large amounts of storage and processing power are needed and may not be available. In addition, speed of analysis becomes an issue when response times are important.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

Figure 1:
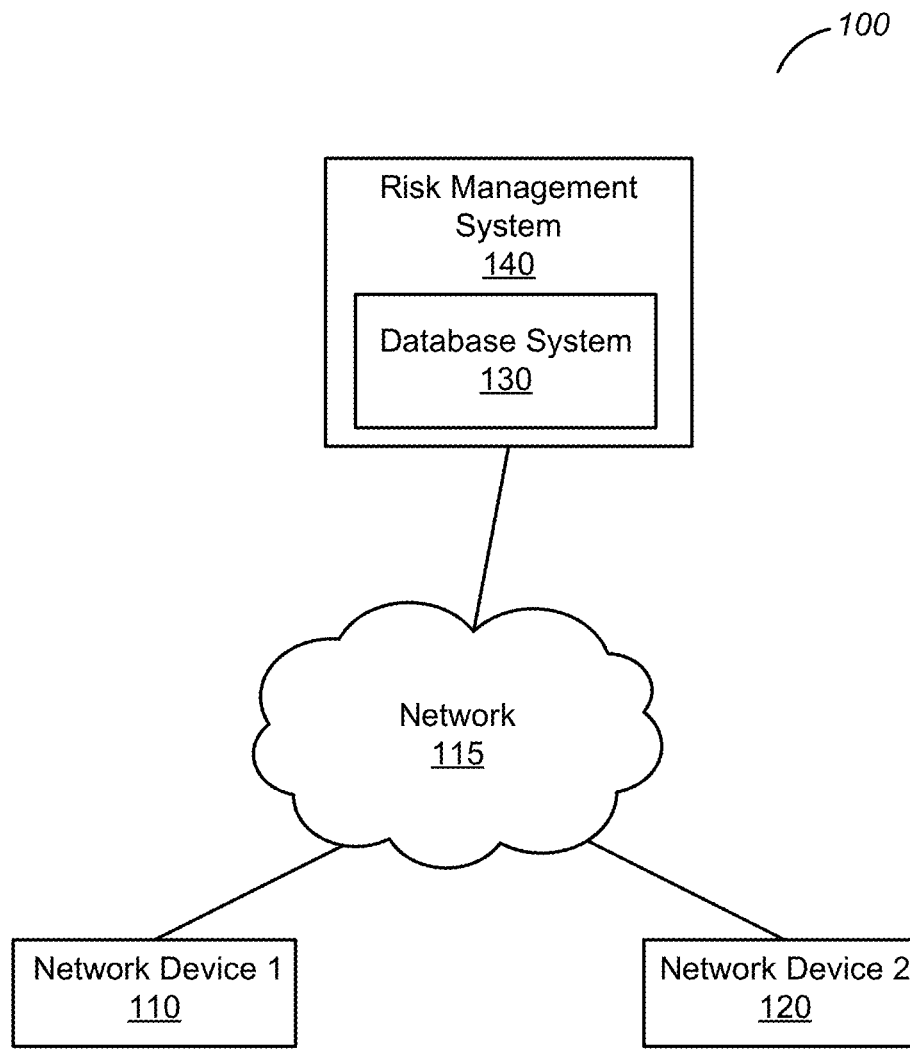
FIG. 1 illustrates one embodiment of a system that collects network and port data and analyzes that data to identify and track malicious activity on the network, in accordance with some embodiments of this disclosure.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

One embodiment, a system, method, and computer readable storage medium are disclosed describing a mechanism for tracking malicious activity detected on a network. For example, based on network data collected from a server, the disclosed system may detect malicious activity originating from a client device directed to the server. To detect the malicious activity, network data may be captured by the server and analyzed. When malicious activity is detected, the system may track the malicious activity (e.g., using the network data) to an earliest connection date of a client device from where the malicious activity potentially originated. The earliest connection date may indicate a potential start date of the malicious activity. Thus, identifying an earliest connection date enables tracking a possible data breach to a start date. This tracking is made more efficient by shrinking the data to a manageable size. An administrator, based on the earliest connection date, may identify the issue caused by the client device and fix the issue (e.g., restore the server to a point in time prior to the earliest connection date or remove files that have been created on or after the earliest connection date). In some embodiments, the system may take automatic action to deal with the malicious activity.

To this end and others, in an embodiment, a malicious activity detector detects malicious activity associated with a first device connecting through a network to a second device, such that the malicious activity is detected in association with a network port of the second device to which the first device connected. Responsive to detecting the malicious activity, a malicious activity tracker retrieves an address for the first device, and transmits, to a database, a request for network port data associated with the address, such that the request includes the address. Responsive to the request, the malicious activity tracker receives the network port data for the first device. The network port data may include data corresponding to the network port to which the first device connected. The malicious activity tracker determines, using the network port data and based on the address and the network port over which the first device connected, an earliest connection date of the first device to the network port of the second device, and provides an indication of the earliest connection date.

Tracking Malicious Activity to an Earliest Connection Date

FIG. 1 illustrates one embodiment of a system that collects network and port data and analyzes the data to determine and track malicious activity on the network. System 100 includes a network device 110, network device 120, network 115, and a risk management system 140 that encompasses a database system 130. Network device 110 may be any device that is able to connect to a network (e.g., network 115). For example, network device 110 may be a computer, a smart phone, an electronic tablet, a server device, or another suitable network device. Network device 110 may connect to network 115 using a wire or wirelessly. Network device 120 may also be any device that is able to connect to a network (e.g., network 115). For example, network device 110 may be a computer, a smart phone, an electronic tablet, a server device, or another suitable network device. Network device 120 may also connect to network 115 using a wire or wirelessly. One or both of network device 110 or network device 120 may act as a server and host a service that can accept connections from other devices. Some examples of services include web service, email service, and/or other application specific services. Those services are generally accessed through a network (e.g., network 115).

Network 115 may be any network that enables devices to connect to each other. For example, network 115 may be the Internet, a local network, or a combination of the two. Network 115 may support various protocols to connect devices. For example, network 115 may support an Internet Protocol (IP) that enables connections between devices using IP addresses. The IP protocol is generally used in combination with a Transmission Control Protocol (TCP) which is a set of protocols enabling devices to connect to each other. Together TCP and IP are often referred to as TCP/IP. These connection protocols enable multiple services to be available on a single device by virtually partitioning a host device into various network ports. Each service accepts connections on one or more network ports which identify that service on the network. When any network device that supports TCP/IP receives data specifying a network port, that device may in turn send the data to a specific application that is mapped to that network port.

Generally, network devices have facilities to keep track of network activity, both incoming and outgoing, in what is referred to as a log or a log file. Network devices may store one or more logs for various network activities. Those logs may be exported or sent to another location (e.g., another network device), for example, for performing analysis for any performance problems or malicious activity.

Risk management system 140 may be a network device that can receive log files and perform the analysis on the log files. Risk management system 140 may be a computer, a smart phone, an electronic tablet, a server device, or another suitable network device. Risk management system 140 includes a database system 130 for storing and manipulating incoming data (e.g., log file data described above). Although database system 130 is illustrated as contained within risk management system 140, database system 130 may reside on another server or network device enabling risk management system 140 to connect and execute commands related to the data stored in the database system 130.

Figure 2:
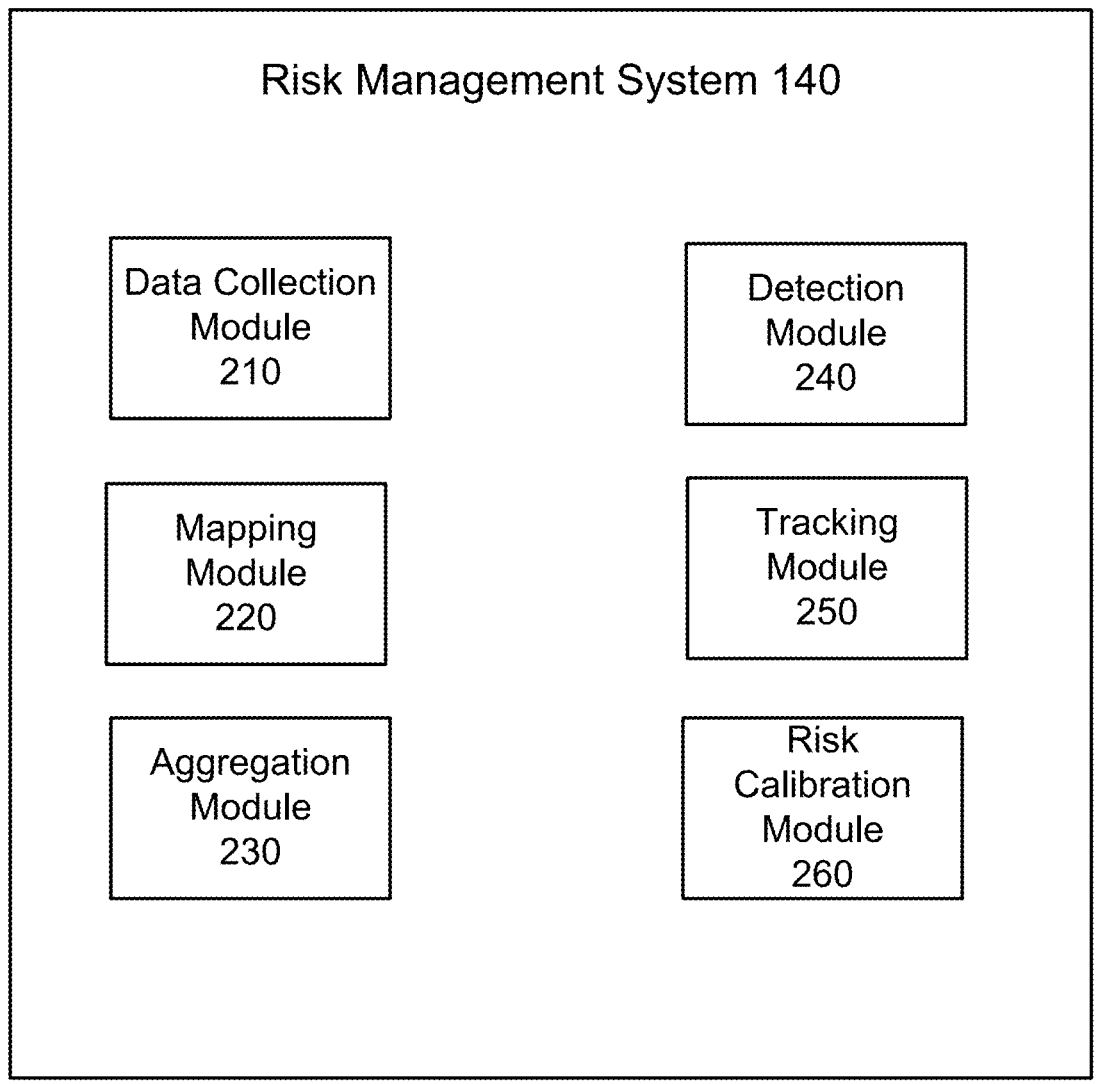
FIG. 2 illustrates one embodiment of exemplary modules of a risk management system, in accordance with some embodiments of this disclosure.

FIG. 2 illustrates one embodiment of exemplary modules of risk management system 140. Risk management system 140 includes, a data collection module 210, a mapping module 220, an aggregation module 230, a detection module 240, a tracking module 250, and a risk calibration module 260. The modules depicted in FIG. 2 are merely exemplary; fewer or more modules may be included to execute the functions described with respect to the risk management system 140.

Figure 12:
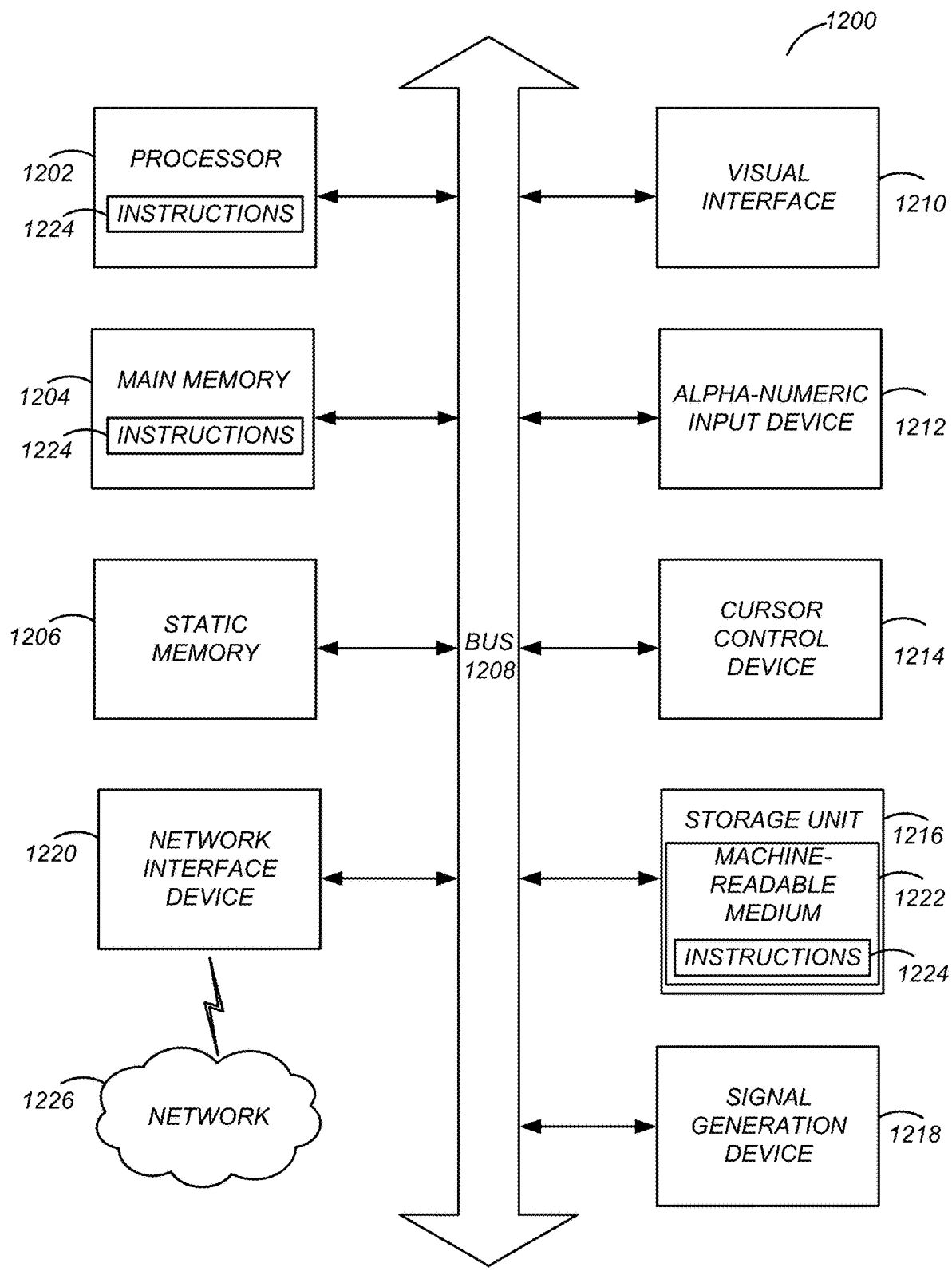
FIG. 12 is a block diagram illustrating components of an example machine able to read instructions from a machine-readable medium and execute them in a processor (or controller), in accordance with some embodiments of this disclosure.

Data collection module 210 collects network data that is used by other modules in various ways. Data collection module 210 may collect data from various sources (e.g., a server, a network device, or another suitable source). Data collection module 210 may continuously scan and gather network data about reachable computing devices (e.g., Internet servers). The network data may include any discoverable data, such as port status data, banner data, certificate data, landing page html code, or other suitable network data. Data collection module 210 may encompass software components, hardware components, or a combination of both. For example, the data collection module 210 may include a software component that retrieves received network data and stores the received network data in a database (e.g., database system 130). Data collection module 210 may also include hardware components such as a network adapter (e.g., a network card), one or more processors, memory, and/or other suitable hardware components as shown in FIG. 12. Moreover, data collection module 210 may receive the network data from various network devices using the network card, use one or more processors for executing various software components, and may use memory to store various data and instructions (e.g., as shown in FIG. 12).

Mapping module 220 converts the received network data to a format that other modules of the risk management system 140 can use. For example, the mapping module 220 may receive network connection data associated with a network-connected device. The received network connection data may be for a server (e.g., network logs from the server) or from another suitable device. The network connection data may include a multitude of addresses for a multitude of connecting network devices. The network data may also include a multitude of network port identifiers corresponding to ports over which the multitude of devices are connecting to the network-connected device. Mapping module 220 may generate a data structure for the network connection data. The data structure may include multiple entries, such that each entry includes an address field for storing an address for a connecting device, a date field for storing earliest connection dates, and a network port field for storing a network port identifier for a port over which the connected device connected. Other fields may also be included in the data structure.

Mapping module 220 may encompass software components, hardware components, or a combination of both. For example, mapping module 220 may include a software component that retrieves received network data from, for example, a database (e.g., database system 130), transforms the data into a data structure (e.g., as described above), and stores the data structure in memory or in another suitable location. The mapping module 220 may also include hardware components, for example, a memory (e.g., a random-access memory) to store the network data as the network data is transformed, one or more processors for executing various software components, and other suitable hardware components (e.g., as shown in FIG. 12).

Figure 3:
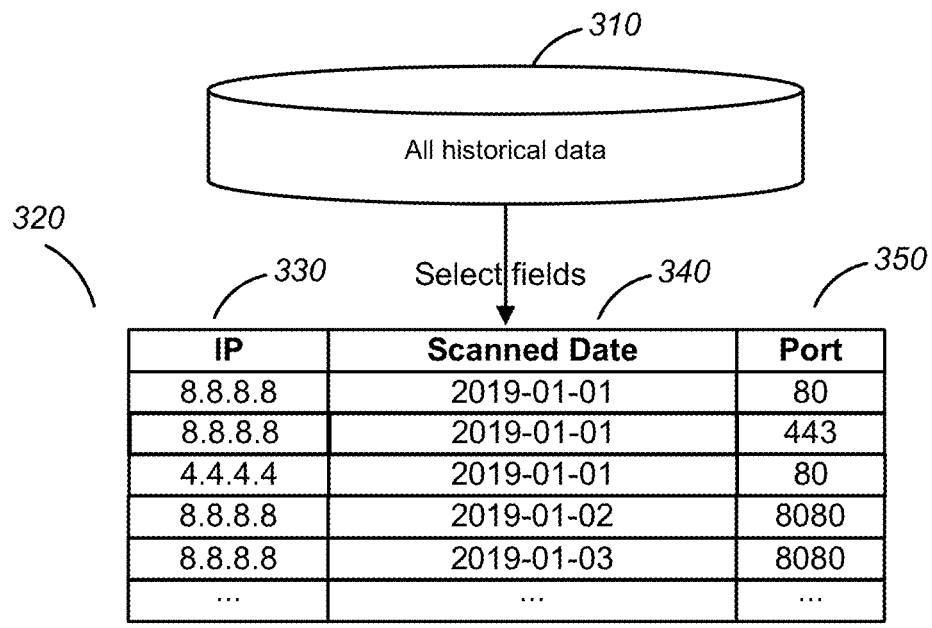
FIG. 3 illustrates a possible output of the mapping module, in accordance with some embodiments of this disclosure.

FIG. 3 illustrates an exemplary output of the mapping module 220. Thus, mapping module 220 may receive network data and extract select fields from the network data. In an embodiment, mapping module 220 may execute instructions to process various formats of network data. For example, a first format may include specific flags for different types of fields, while a second format may include different flags for those same types of fields. Mapping module 220 may access network data 310 that includes network connection data and generate a data structure 320 with fields 330, 340, and 350 as shown in FIG. 3. Field 320 may include IP address data identifying an IP address of the connecting device. Field 340 may include a scanned date identifying a date (and/or time) that the connection was made. Field 350 may include port data indicating a connection port. Mapping module 220 may retrieve entries from the network data 310 and copy the network data to data structure 320 according to the field types.

Aggregation module 230 aggregates the received network data (e.g., data formatted by the mapping module 220) into a data set that can be efficiently analyzed by the risk management system 140. Aggregation module 230 may include hardware, software or a combination of both. Aggregation module 230 may retrieve network data (e.g., mapped network data) and may determine whether that network data may be optimized. Based on the determination that the network data may be optimized (e.g., shrunk to a more manageable size), aggregation module 230 optimizes the network data. Thus, the output of aggregation module 230 may be structured data. For example, aggregation module 230 may identify, within a data structure (e.g., a data structure generated by mapping module 220), entries where values in an address field and a date field match corresponding values in the address field and the date field of other entries. Aggregation module 230 may merge, into a plurality of network port aggregated entries, entries where both values in the address field and the date field match corresponding values in the address field and the date field of other entries. In some embodiments, some network port aggregated entries may store two or more network port values while other port aggregated entries may store one network port value.

Figure 4A:
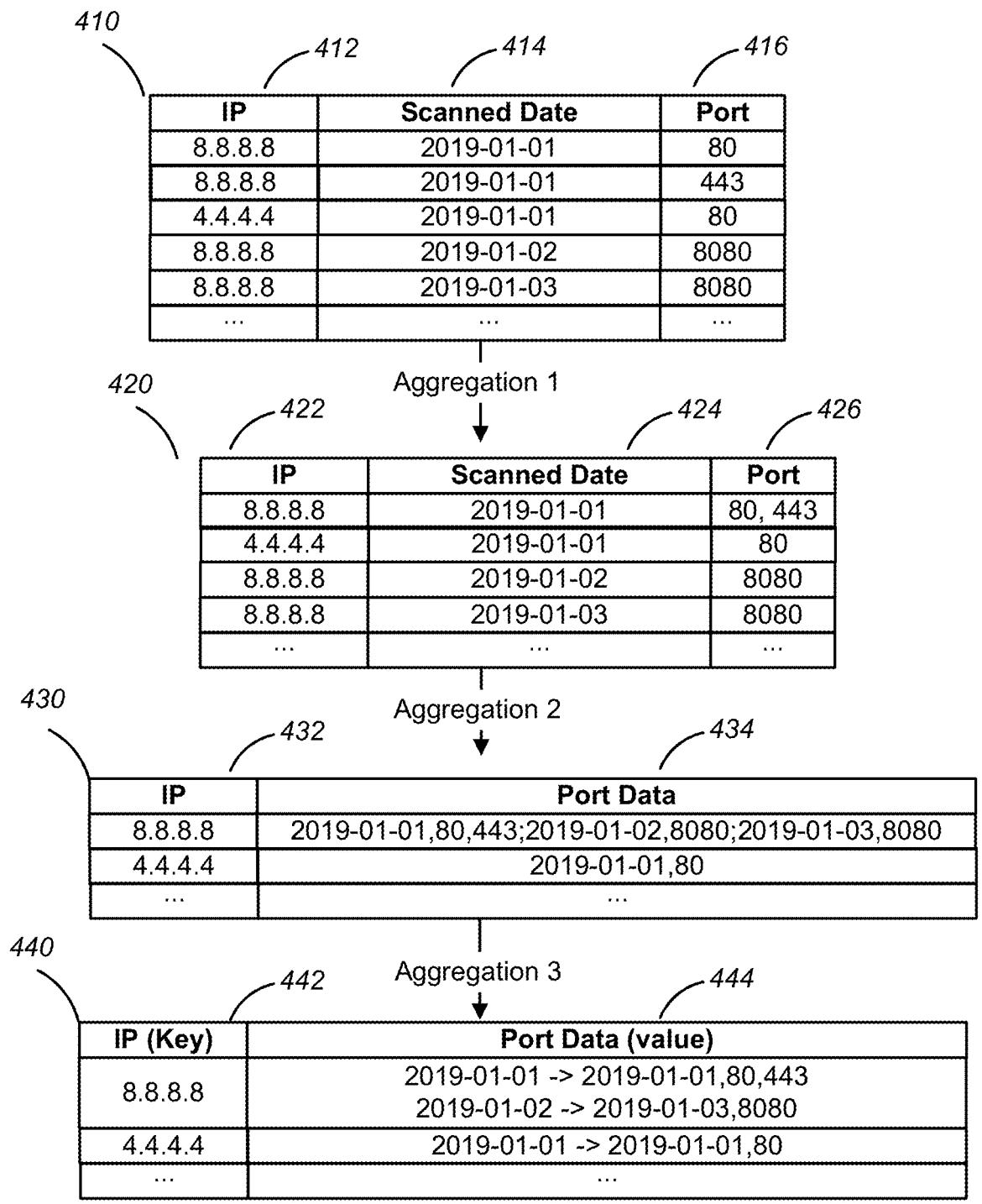
FIG. 4A illustrates inputs and results for several aggregation functions, in accordance with some embodiments of this disclosure.

FIG. 4A illustrates inputs and results for several aggregation functions. Data structure 410 illustrates IP address field 412 that stores IP address data of a connecting network device, scanned date field 414 that stores a date when the connection was made by that network device, and port number field 416 that stores a connecting port number for that network device. Data structure 410 may be an output of mapping module 220. Data structure 420 illustrates an output of an aggregation function of an aggregation module (e.g., aggregation module 230). IP address field 422 stores a connecting IP address, scanned date field includes a connection date (and/or connection time) and port field 426 may store one or more port numbers. As described above, the aggregating module, when executing this function, searches fields 412 and 414 in data structure 410 and combines the ports in field 416 when both values in field 412 and field 414 match the corresponding fields in another entry.

In some embodiments, aggregation module 230 may further aggregate the collected network data. This aggregation function of aggregation module 230 may take a data structure 420 (described above) as input. Aggregation module 230 may identify all entries within a data structure (e.g., within data structure 420) that have matching IP addresses in the IP address field 422. Aggregation module 230 may combine, for all entries with matching IP addresses, the scanned date fields 424 and the port fields 426. The result of the function is illustrated by data structure 430 where IP address field 432 stores IP addresses for connecting devices and port data field 434 stores dates and corresponding port numbers. Port data field 434 is illustrated as storing the network data in <date>,<port numbers separated by commas>. However, any other suitable format can be used in data structure 430.

In other words, aggregation module 230 may identify, within the plurality of network port aggregated entries, network port aggregated entries where values in the address field match values in the address field of other network port aggregated entries. Aggregation module 230 may merge, into a plurality of network port-date aggregated entries, the network port aggregated entries where values in the address field match corresponding values in the address field of the other network port aggregated entries. In this and other embodiments each of the one or more network port-date aggregated entries in the plurality of network port-date aggregated entries may include a field with a plurality of dates and corresponding network port numbers for each date.

In some embodiments, the aggregation module 230 may combine the port data into date ranges for specific ports. This function of the aggregation module 230 may take, as input, a data structure that includes an IP address field and a port data field (e.g., data structure 430). Aggregation module 230 may scan each entry and identify, based on connection dates, one or more ports corresponding to those connection dates. Based on that information, aggregation module 230 may generate connection date ranges for ports and/or port groups. Data structure 440 is an example of a data structure that aggregation module 230 may output based on this function. Data structure 440 includes an IP address field 442 that stores IP address information and that may act as a key into the data structure and a port data field 444 that stores aggregated network data. Although, as shown in FIG. 4A, the network data may be stored in the <start date>-><end date>, <one or more port numbers separated by commas> format, the network data may be stored in any suitable format that indicates a date range and corresponding network ports.

In other words, aggregation module 230 may identify, within each network port-date aggregated entry of the network port-date aggregated entries, one or more date ranges with corresponding multiple network ports. Aggregation module 230 may update each network port-date aggregated entry to a format that maps one or more date ranges to one or more network ports.

Detection module 240 detects malicious activity associated with a device connecting through a network to a second device. Detecting module 240 may detect malicious activity in association with a network port of the second device to which the first device connected. That is, detection module 240 may analyze network data (e.g., historical network data) for malicious activity. In some embodiments, detection module 240 may generate time series data based on open port data found during a search, as described above. Detection module 240 may use the time series data in several ways to detect malicious behavior. The time series data may be integrated with retrospective search results for detecting malicious activity. The time series data may also be used in machine learning (ML) models to detect malicious activity.

Detection module 240 may reference historical data to evaluate each occurrence of an Indicator of Compromise (IOC) with timed factors. Occurrence of IOC may have a relationship with time. For example, same IOC may have a different threat level (e.g., risk score) in different periods of time. Detection module 240 may analyze port behaviors and may provide to an analyst (i.e., the person running the above-described search) a recommended date to investigate and take actions to reduce the potential impact of the incident.

Detection module 240 may use a malicious activity detection ML model built using network port data as it related to potential activity by an attacker. Attacker's activities can be reflected in behaviors of the attacker's software as that behavior pertains to network port activity. Software being executed by an attacker frequently opens and closes ports or jumps from one port to another to avoid detection. For example, the software being executed by a malicious actor may open a large number of ports in comparison to software run by regular users which opens only a few ports. In addition, the lifetime of open ports for an attacker's software is shorter than lifetime of open ports for regular users. Therefore, the ports' behavior can be used as a signal to detect malicious activity.

Received network data (e.g., as discussed above) includes open port timeline data which provides a full view of the actors' port behavior, such as which ports are open, how long is their lifetime, and how frequently each port is open and closed. Thus, the received network data, may be used to extract features for the ML model (e.g., a binary classifier). The ML model may be trained on the extracted features to detect malicious actors and benign actors using binary classifiers. To detect malicious actors from their port behavior two novel frameworks may be used: a feature-based framework and a featureless framework. In a feature-based framework, a feature-based model may use extracted features from the open port timeline data received as part of the network data. In a featureless framework, a featureless model learns the features by itself.

The feature-based network may be trained using specific features extracted from network data collected from known attacks. As described above, the features may include a number of ports opened by a client device and duration of the ports being in the open state. Using the open port timeline data in the received network data, the detection module 240 may extract features (e.g., number of open ports from a client device and/or duration of each port being opened) that may be input into a ML model (e.g., a binary classifier). In some embodiments, the detection module 240 may extract statistics about the lifetime of each open port, the frequency of each port being opened and closed, the number of open ports, and/or the first and last time the ports were open.

Figure 4B:
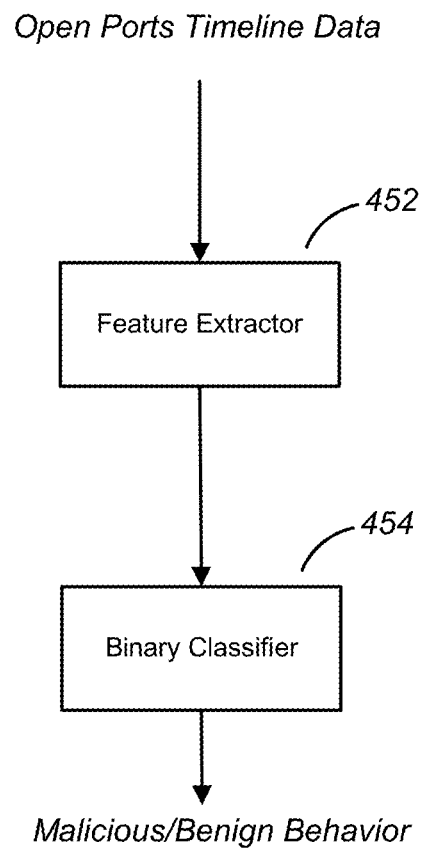
FIG. 4B illustrates a feature-based framework for detecting malicious activity, in accordance with some embodiments of this disclosure.

FIG. 4B illustrates a feature-based framework for detecting malicious activity. The detection module 240 may input the open ports timeline data into feature extract 452. The feature extractor 1302 may include software components, hardware components or a combination of software and hardware components. The feature extractor 452 may extract features (e.g., open port duration, frequency of opening and closing ports, and other suitable features) from the open ports timeline data. The feature extractor 452 may output the extracted features. The detection module 240 may receive the extracted features from the feature extractor 452 and input the extracted features into binary classifier 454. The binary classifier 454 may receive the extracted features and output a value (e.g., a Boolean value) indicating whether the extracted features indicate that the client device exhibits malicious or benign behavior.

Referring now to a featureless framework, the featureless framework does not depend on extracting features from open ports timeline data. In some embodiments, features as extracted from the network data may not enable a machine learning model to identify whether malicious activity has occurred. However, there may be other data in the open ports timeline data that indicates malicious activity. Thus, the featureless framework enables training an ML model (e.g., a binary classifier) without the need to extract features. Instead, the binary classifier is trained on the timeseries representation data indicating prior malicious behavior.

Figure 4C:
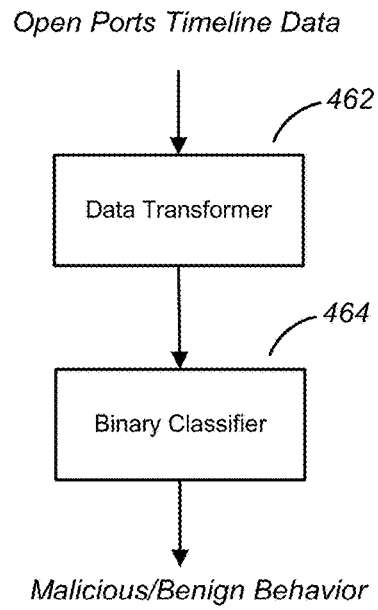
FIG. 4C illustrates a featureless framework for detecting malicious activity, in accordance with some embodiments of this disclosure.

FIG. 4C illustrates a featureless framework for detecting malicious activity. Detection module 240 may input the open ports timeline data into the data transformer 462. The data transformer 462 may transform the open ports timeline data into a timeseries representation. The data transformer 462 may include software components, hardware components, and/or a combination of both hardware and software components. The detection module 240 may receive the timeseries representation from the data transformer 462 and input the timeseries data into a binary classifier 464. The binary classifier 464 may receive the timeseries data and output a value (e.g., a Boolean) indicating whether malicious or benign behavior has been detected. The binary classifier 464 or the binary classifier 545 may be neural network that can be trained to recognize features from the timeseries data.

Open ports timeline data may include data that show activity on various ports over a certain period of time (e.g., six hours, one day, three days, or another suitable period of time). For example, for a specific port, the data indicates the days that the port was open or closed during the time period. The data transformer 462 may use the timeline data to build a timeseries representation of the open port timelines. The data transformer 462 may analyze a list of specific ports and a time window. For each port, the data transformer 462 may analyze a series with the length of the specified window. In that series, for each day that the port is open the data transformer may set the value of the series as 1 in the corresponding index. Otherwise, the value of the series for that day may be set to 0. For each of the specific ports, the data transformer may generate a corresponding timeseries. For example, for p interested ports and a window size of d days, the open port representation for each IP address may be an array with p rows and d columns.

Figure 4D:
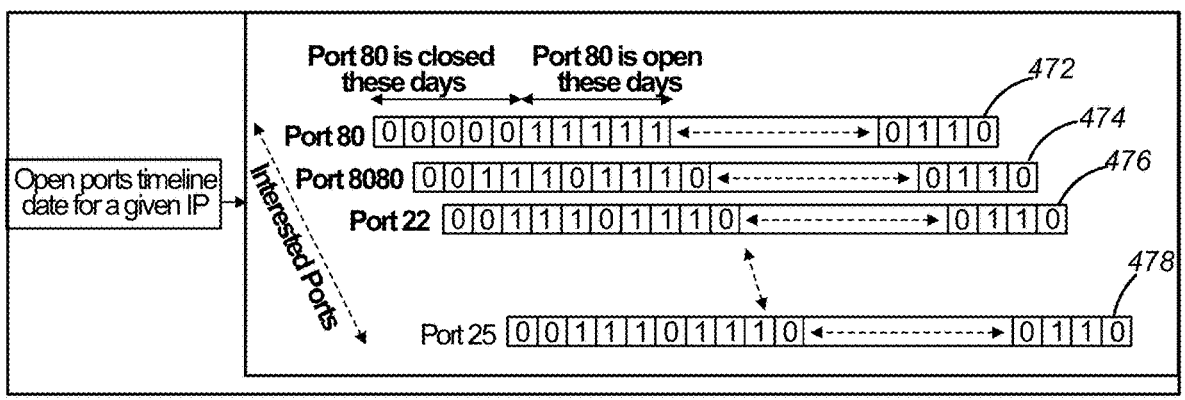
FIG. 4D illustrates a timeseries representation for a number of ports, in accordance with some embodiments of this disclosure.

FIG. 4D illustrates a timeseries representation for a number of ports. Time series 472 represents a timeseries representation for port 80 being access by a specific client device. Each instance of zero or one may indicate a port being open or closed on a specific day. For example, during the first five days the port has been closed and during the second five days the port has been open. Timeseries 474 illustrates a timeseries for port 808, timeseries 476 illustrates a timeseries for port 22, and timeseries 478 illustrates a timeseries for port 25.

As discussed above, the detection module 240 may input into the classifier timeseries data without extracting any features. Various machine learning models that can handle timeseries data. For example, recurrent neural networks, and Convolutional Neural Networks (CNN) can handle timeseries data. In some embodiments CNN may be preferable for the binary classifier because each IP address may have multiple timeseries, one series for each interested port as shown in FIG. 4D.

Figure 4E:
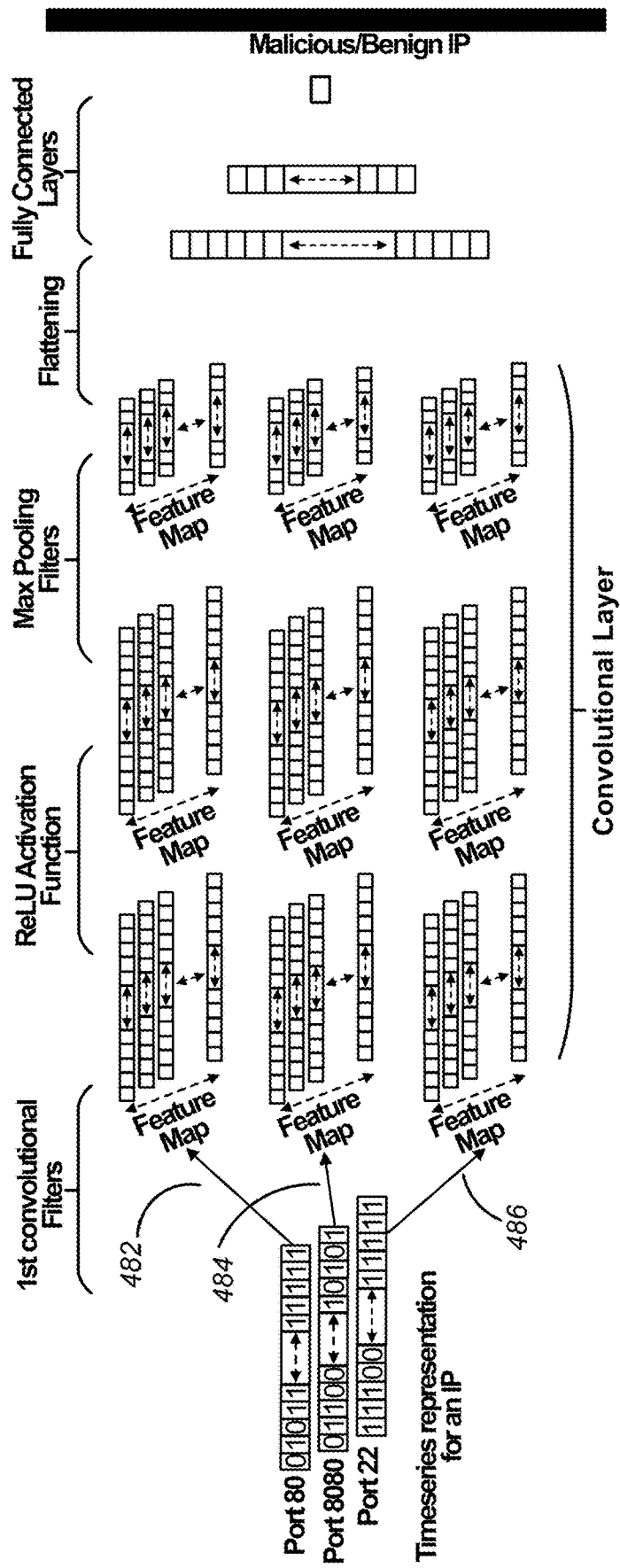
FIG. 4E illustrates a Convolutional Neural Network, in accordance with some embodiments of this disclosure.

FIG. 4E illustrates a Convolutional Neural Network. The CNN model illustrated in FIG. 4E may include 1D convolutional layers. The timeseries representation of each port may be represented as a 1D array and the timeseries of different ports are represented as input to different channels 482, 484, and 486, respectively. The CNN model in FIG. 4E can capture the temporal dependencies in timeseries representation through the application of relevant filters. As a result, the computational power required to process the data may be decreased and a smaller set of training data may be utilized.

Furthermore FIG. 4E is an example of the CNN classifier that may be used with open port timeseries representation. In this model, the timeseries representation may be turned to Feature Maps using convolutional operations. A convolution operation is an element wise matrix multiplication operation between the input and a 1D filter (or kernel). During training, the model learns the kernels. The Feature Map representations contain important information gained by the kernel. The Feature Maps are going through activation functions to add non-linearity to the model to be able to learn complex patterns. In some embodiments, Max Pooling may be applied to reduce variance and computations and extract low-level features. Convolutional operation, activation functions, and Max Pooling, may build one Convolutional Layer. Convolutional Layers may be more responsible for extracting the features. The output of Convolutional Layers may be flattened and serve as input to a fully connected network to classify the timeseries representation as malicious or benign.

Figure 5:
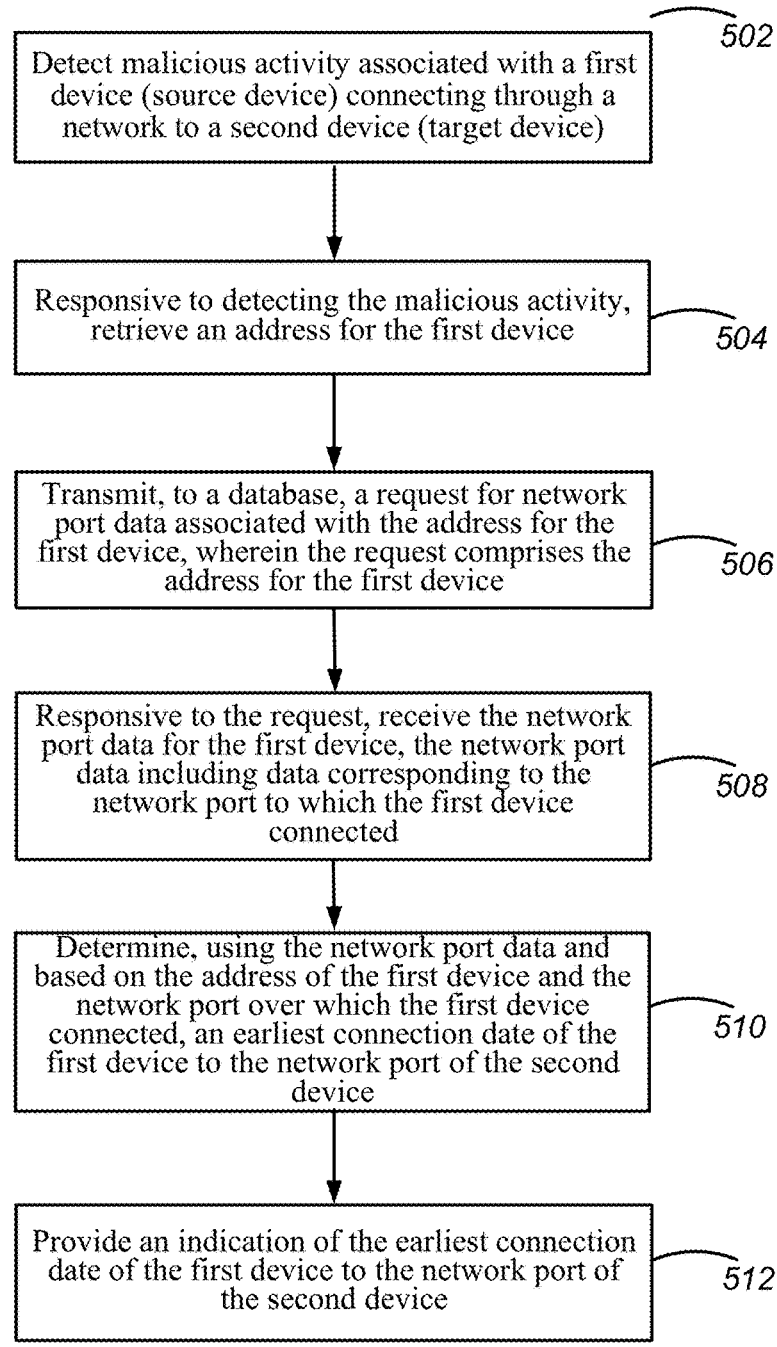
FIG. 5 illustrates a flowchart of actions for tracking malicious activity, in accordance with some embodiments of this disclosure.

Tracking module 250 tracks malicious activity to an earliest connection date (and/or time) of the malicious network device. FIG. 5 illustrates actions for tracking malicious activity. When at 502 the detection module (e.g., detection module 240) detects malicious activity associated with a source device connecting through a network to a target device, detection module 240 may transmit an indication to the tracking module (e.g., tracking module 250). The indication may include appropriate data needed by tracking module 250 to track the malicious activity. For example, detection module 240 may transmit an IP address of the source and/or target network device to tracking module 250. Detection module 240 may pass other information to tracking module 250, for example, a port number on the target device of a port which is used for malicious activity.

At 504, responsive to detecting the malicious activity, tracking module 250 may retrieve an address for the source device (i.e., the device from which the malicious activity was detected). Tracking module 250 may retrieve the address from the data received from detection module 240. At 506, tracking module 250 may transmit, to a database (e.g., database system 130), a request for network port data associated with the source address, the request including that source address. For example, the tracking module 250 may transmit a database query to the database (e.g., database system 130) for network port data associated with the address received from the detection module 240. At 508, responsive to the request, the tracking module 250 may receive the network port data for the source device. The network port data may be network port data processed by the mapping and the aggregation modules (e.g., mapping module 220 and aggregation module 230, respectively).

At 510, the tracking module 250 may determine, using the network port data and based on the address and the network port over which the source device connected, an earliest connection date (and/or time) of the source device to the network port of the target device. For example, the tracking module 250 may search, in the network port data, for the IP address of the source device. When the tracking module 250 locates the IP address (e.g., an entry in a table) the tracking module 250 may identify (e.g., in the entry) the port number associated with the malicious activity. The tracking module 250 may retrieve the date range during which the port was connected and extract the earliest connection date (e.g., the start date) from the range. In some embodiments, the start data may include a time in addition to the date.

At 512, the tracking module 250 may provide (e.g., as an output) an indication of the earliest connection date. In some embodiments, where the network device hosting the tracking module 250 has a display screen (e.g., is a workstation computer, electronic tablet, or another suitable device having a display screen) the tracking module 250 may output the results of tracking into the display screen. In some embodiments, where the tracking module 250 resides on a host that does not have a display screen (e.g., is a server, a switching device, a routing device, or another suitable device) the tracking module 250 may transmit the results of the tracking to another network device.

Figure 6:
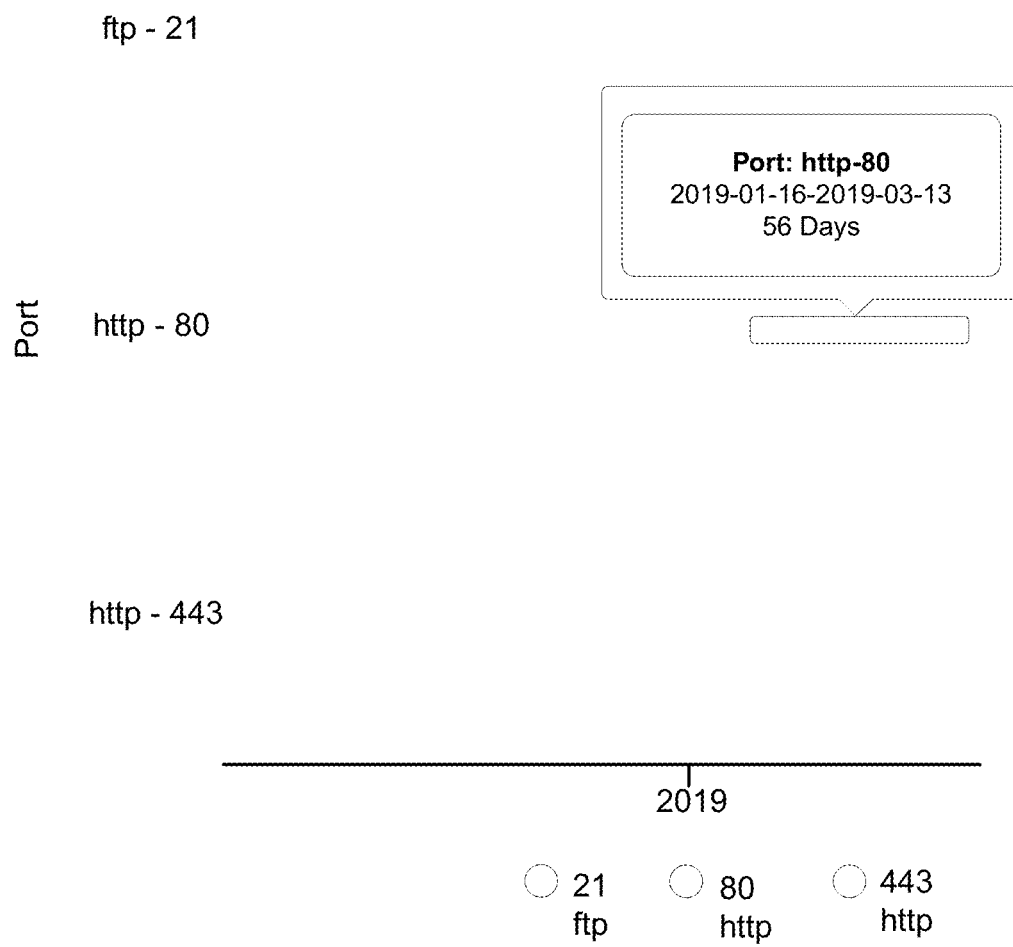
FIG. 6 is an illustration of an output screen for tracking malicious activity, in accordance with some embodiments of this disclosure.

FIG. 6 is an illustration of an output screen for tracking malicious activity. FIG. 6 includes an indication of a source IP address (i.e., the source of the connection) as well as the port number with detected malicious activity. FIG. 6 also illustrates a date range of the connection to the port from the source IP address. In addition, FIG. 6 includes a number of days that the port has been connected.

In some embodiments, the tracking module 250 may track all the IP addresses and port number over which the source device (i.e., the device from which malicious activity has been detected) so that an earliest connection date for any port (not just the port over which malicious activity was detected) for that device is identified and used as the earliest connection date. For example, the tracking module 250 may identify other network ports to which the first device has connected. That is the tracking module 250 may identify other network ports are not associated with the malicious activity. For example, the tracking module 250 may access network port data and search for the IP address associated with the source device. The tracking module 250 may locate an entry associated with the source device (e.g., a mapped and aggregated entry as described above).

The tracking module 250 may determine a corresponding earliest connection date of the source device to each network port of the other network ports. For example, the tracking module 250 may retrieve connection date range for other ports associated with the IP address of the source device. The tracking module 250 may identify the earliest start date in the ranges. The tracking module 250 may set the earliest connection date to a value corresponding to an earliest connection date of one of the other network ports (e.g., the earliest start date found in the date ranges). The tracking module 250 may include hardware (e.g., circuitry) and/or software components.

Risk calibration module 260 calculates and modifies a risk score associated with each malicious activity. For example, the risk calibration module 260 may generate risk scores for various devices on the network and modify those risk scores as new network port data is received. The risk module may receive network port monitoring data for a network-connected device. The network port monitoring data may include data on open network ports at the network-connected device. The risk calibration module 260 may determine, based on the network port monitoring data, whether a network port of the network-connected device that is being accessed by a different network-connected device has been open for a threshold amount of time. For example, it may not be normal for a specific port to be open and connected for an extended period of time. In other words, a port may be used by an application to return responses to various queries which usually takes no more than a few minutes. Thus, if such a port is open for a period of twenty-four hours or more, there may be malicious activity associated with that connection. Conversely, if a port has been connected for a relative short period of time, that may indicate a lower threat level. Thus, based on determining that the network port of the network-connected device has not been open for the threshold amount of time, the risk calibration module 260 may reduce a risk score associated with the different network-connected device.

When the risk calibration module 260 determines that the network port of the network-connected device has been open for the threshold amount of time, the risk calibration module 260 may perform more actions to determine whether a threat level for a network device should be raised. The risk calibration module 260 may determine whether a different network-connected device's behavior over the network port of the network-connected device that is being accessed by the different network-connected device has changed over a time period. Based on determining that the different network-connected device's behavior over the network port of the network-connected device has changed over the time period, the risk calibration module 260 may increase the risk score. Based on determining that the different network-connected device's behavior over the network port of the network-connected device has not changed over the time period, the risk calibration module 260 may refrain from increasing the risk score or in some embodiments, decrease the risk score. The risk calibration module 260 may use a threshold risk score to determine whether network port actions should be classified as malicious activity. For example, the risk calibration module 260 may determine whether the risk score is above a risk threshold, and based on determining whether the risk score is above a risk threshold, indicate that malicious activity was detected.

Figure 7:
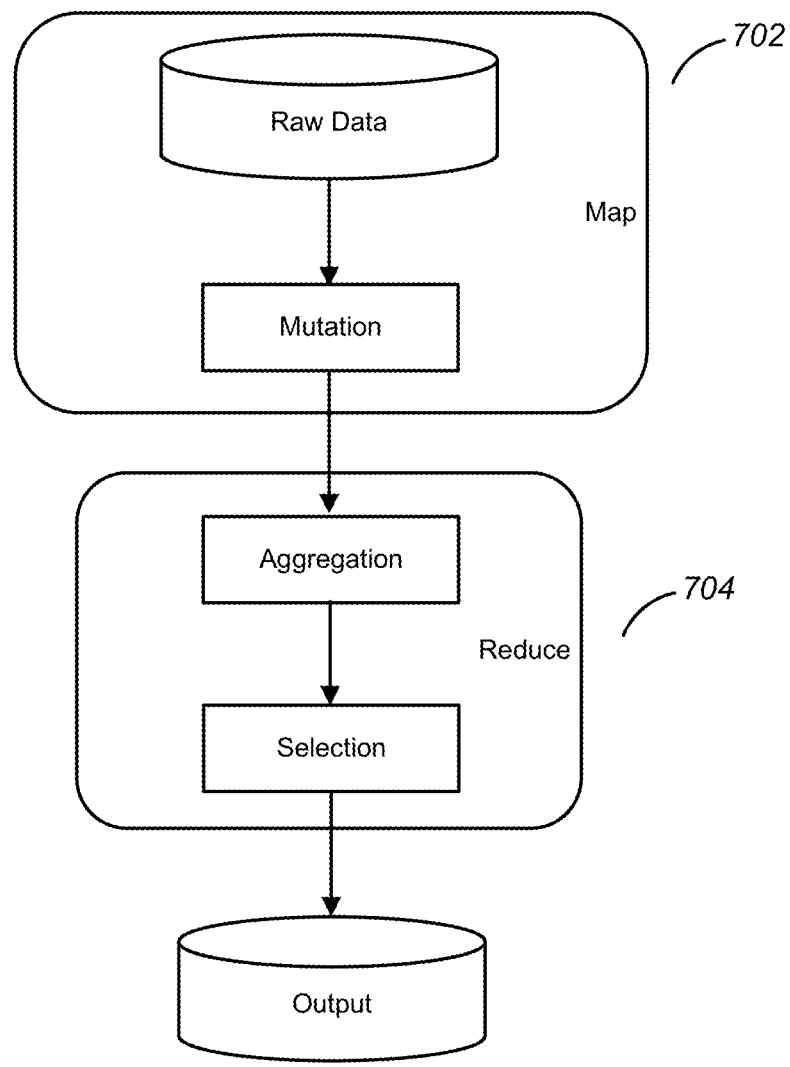
FIG. 7 is a flow chart that illustrates an example of mapping and aggregation processes, in accordance with some embodiments of this disclosure.

FIG. 7 is a flow chart that illustrates mapping and aggregation processes. The extracted data may be one or more orders of magnitude smaller than raw data (e.g., petabytes of data is reduced to gigabytes). In the map transformation 702, the risk management system 140 (e.g., via the mapping module 220) loads raw data from storage, selects an IP address, scanned date and open port data, and processes that information to build a data structure, such as a key-value table, where an address of a discovered network device (e.g., an IP address) is used as the key, and the value is open ports discovered on that discovered network device. This is exemplified by FIG. 3 that was described above.

In the Reduce transformation 704, the risk management system 140 (e.g., via the aggregation module) applies aggregation functions on the data structure derived from the map transformation to transform the data to a series of timeline entries for each unique address (e.g., IP address). The risk management system 140 (e.g., via the aggregation module) further aggregates the data by removing duplicate port data in each successive time range if there is no change found and selects the aggregated results as the output of this step, as shown in FIG. 4A. After applying the Reduce transformation, the size of input data may be reduced by one or more orders of magnitude (e.g., from petabytes into gigabytes). The format of output data from the Map and Reduce transformations may be: IP-Port Data. Because IP address is always a fixed length entity, modern search engines can efficiently index it.

In an embodiment, the output data of the map transformation 720 and the reduce transformation 704 is static, and the process to generate the output data may be long and costly, thus using a pipeline (e.g., as shown in FIG. 7) to serve large real-time queries may not be efficient or economical. To use this data in connection with real-time concurrent queries, the risk management system 140 (e.g., via the data collection module) may index and store the data in a search engine. To make queries to the search engine faster, the risk management system 140 (e.g., via the data collection module) may index the addresses of the computing devices (e.g., IP addresses) and store the rest of data as the value for each indexed address.

In situations where the quantity of data to be indexed is large, the index process may be time consuming. Because indexing is a resource intensive operation, query performance may suffer on a cluster where indexing is running. Therefore, one or more mirror clusters may be used to reduce or eliminate performance degradation of the search engine, as shown in the following figure.

Figure 8:
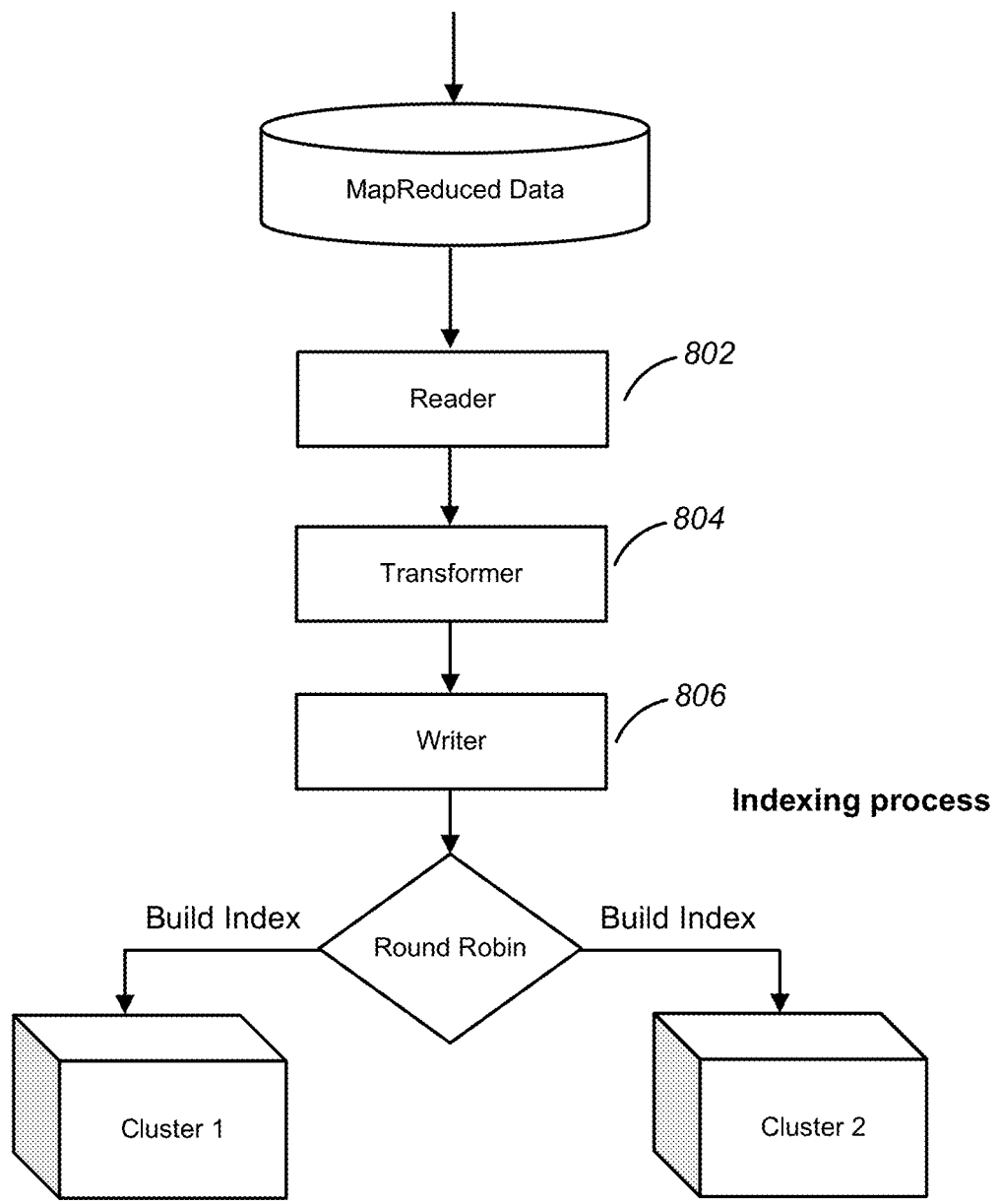
FIG. 8 is an exemplary flowchart of a mapping and aggregation pipeline, in accordance with some embodiments of this disclosure.

FIG. 8 is an exemplary flowchart of the pipeline. Aggregation module 230 may utilize a reader (e.g., reader 802) to read the output of map transformation 702 and reduce transformation 704 by partitioning the data using multithreads, then passing the data to a transformer (e.g., transformer 804) for data format conversion (e.g., for converting data into search engine friendly format, such as Json) work. The output data from the transformer 804 is ready to be indexed on the search engine clusters. The aggregation module 230 may batch write this data to index it on the clusters.

In an embodiment, writer 806 may write the data to a cluster which was not used recently (e.g., Cluster 1 or Cluster 2), and then switch to the other cluster for indexing the next time. While only two clusters are depicted in the pipeline, any number of clusters or other modules may be used.

Thus, by using multithreads and batch writing, the systems and methods described herein improve upon existing implementations by making it possible to finish the index pipeline in shorter time periods (e.g., within 24 hours). Moreover, during indexing, there is always at least one cluster available to serve query.

Figure 9:
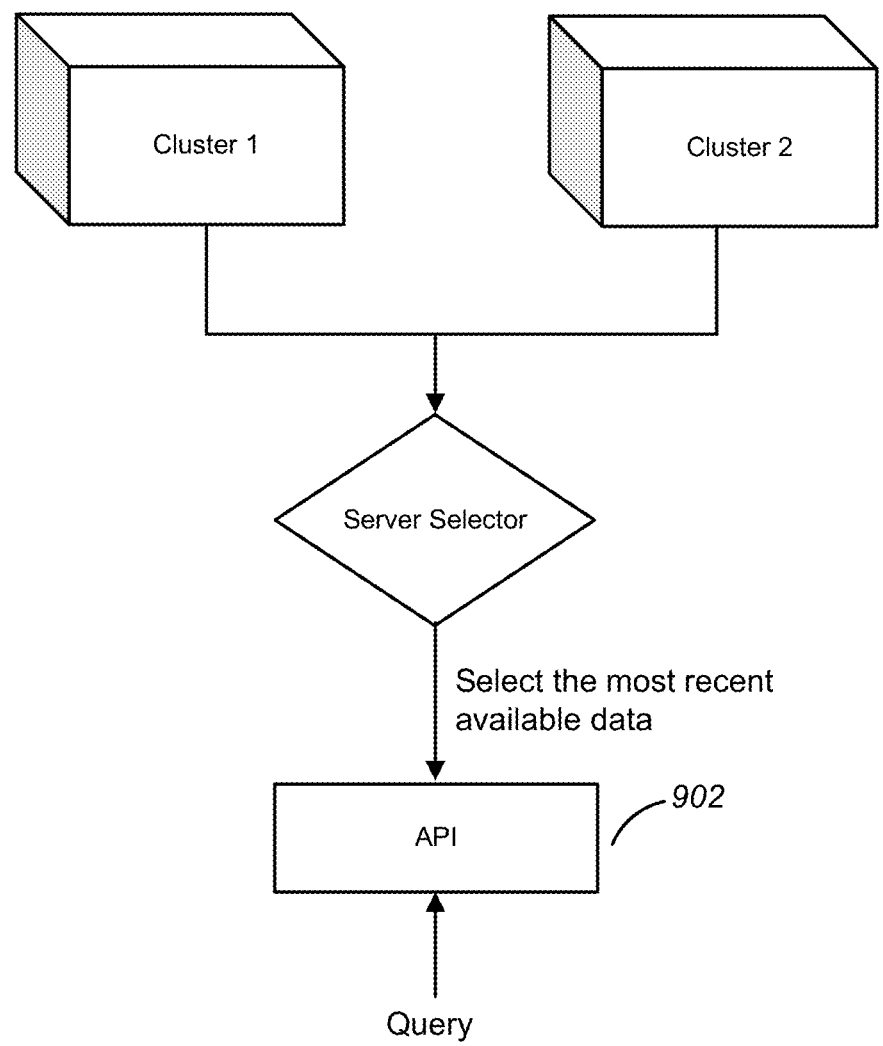
FIG. 9 illustrates a flow chart for using an Application Programming Interface for servicing requests, in accordance with some embodiments of this disclosure.

In an embodiment, after indexing the data in the search engine clusters, the data is refreshed automatically without interruption. FIG. 9 illustrates an Application Programming Interface (API) 902 for servicing requests. The aggregation module 230 may utilize a middleware to respond to an API query from production to the clusters. For each query, the middleware determines which cluster(s) is currently busy indexing and which cluster(s) is available to search. This middleware has the capability to check clusters' status and return the most recent data.

For example, during the time cluster 1 is indexing, the aggregation module 230 may use cluster 2 to serve incoming queries. When the middleware detects that cluster 1 has finished indexing, the aggregation module 230 switches the query cluster to cluster 1 to use the most recently updated indexed data to perform the next search.

Figure 10:
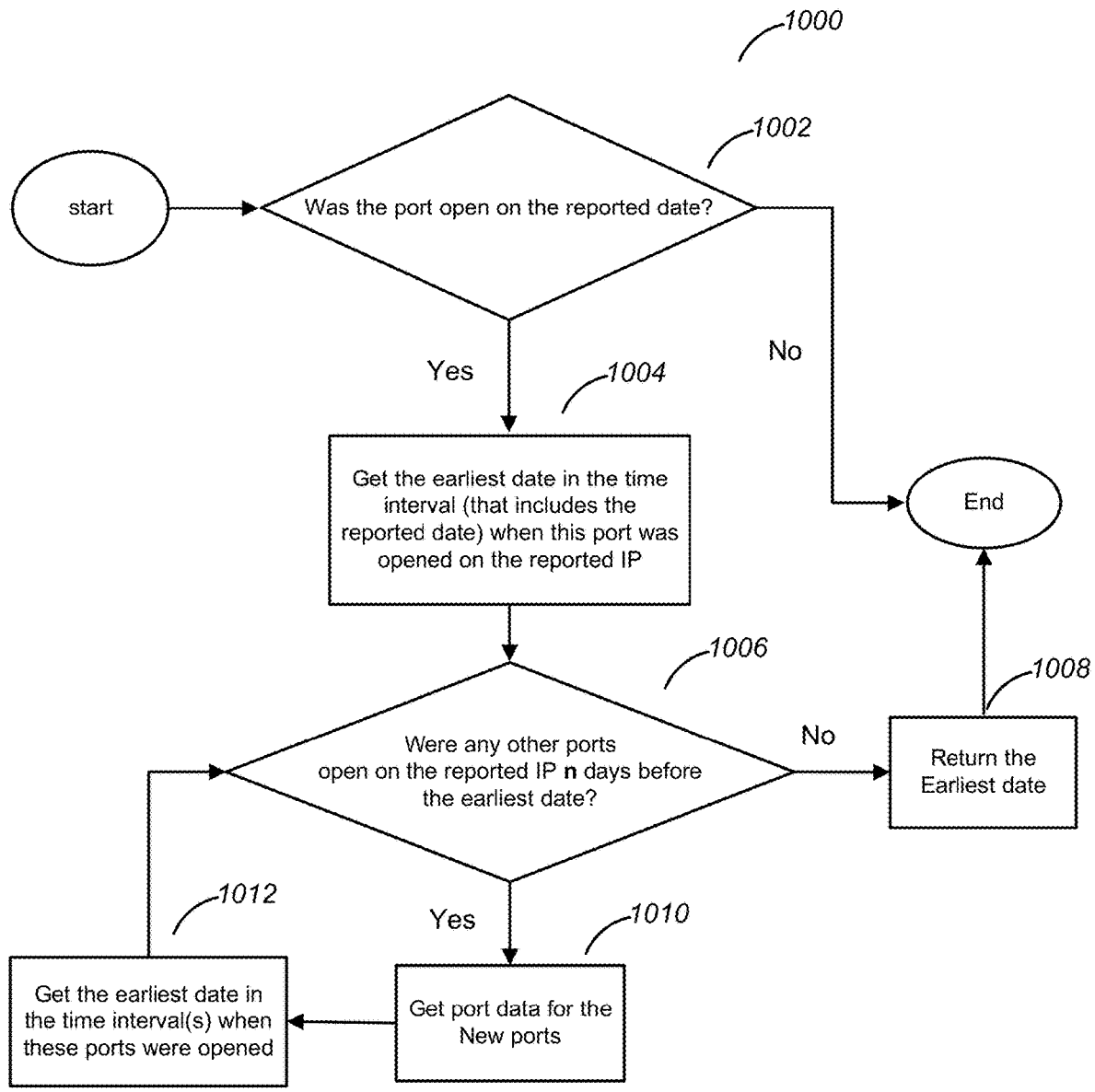
FIG. 10 illustrates exemplary actions for calculating recommended investigation date, in accordance with some embodiments of this disclosure.

In some embodiments, the detection module 240 may use the data to detect malicious activity. FIG. 10 illustrates exemplary actions for calculating recommended investigation date. Based on the data retrieved for the reported IP, the tracking module 250 may verify whether the reported port was open on the reported date, on the reported IP by, for example, analyzing the mapped and reduced data. Based on verification being successful, the tracking module 250, in 1004, may retrieve the earliest date in the time interval (that includes the reported date) when this port was opened on the reported IP. Using this date, in 1006, the tracking module 250 iteratively checks if any other ports were open on the reported IP a certain number of days prior to the data at issue date and gets the associated "first open" dates for those ports. If no other ports have been opened, the tracking module 250, in 1008, returns the earliest date that the port at issue was opened. If other ports were opened, the tracking module 250, at 1010, retrieves port data for any other ports that were open, and in 1012, determines (e.g., from earliest connection dates) the port with the earliest connection date and the earliest connection date itself. That is, through this iterative process, the tracking module 250 is able to determine the earliest date when any port was opened on the reported IP address.

Figure 11:
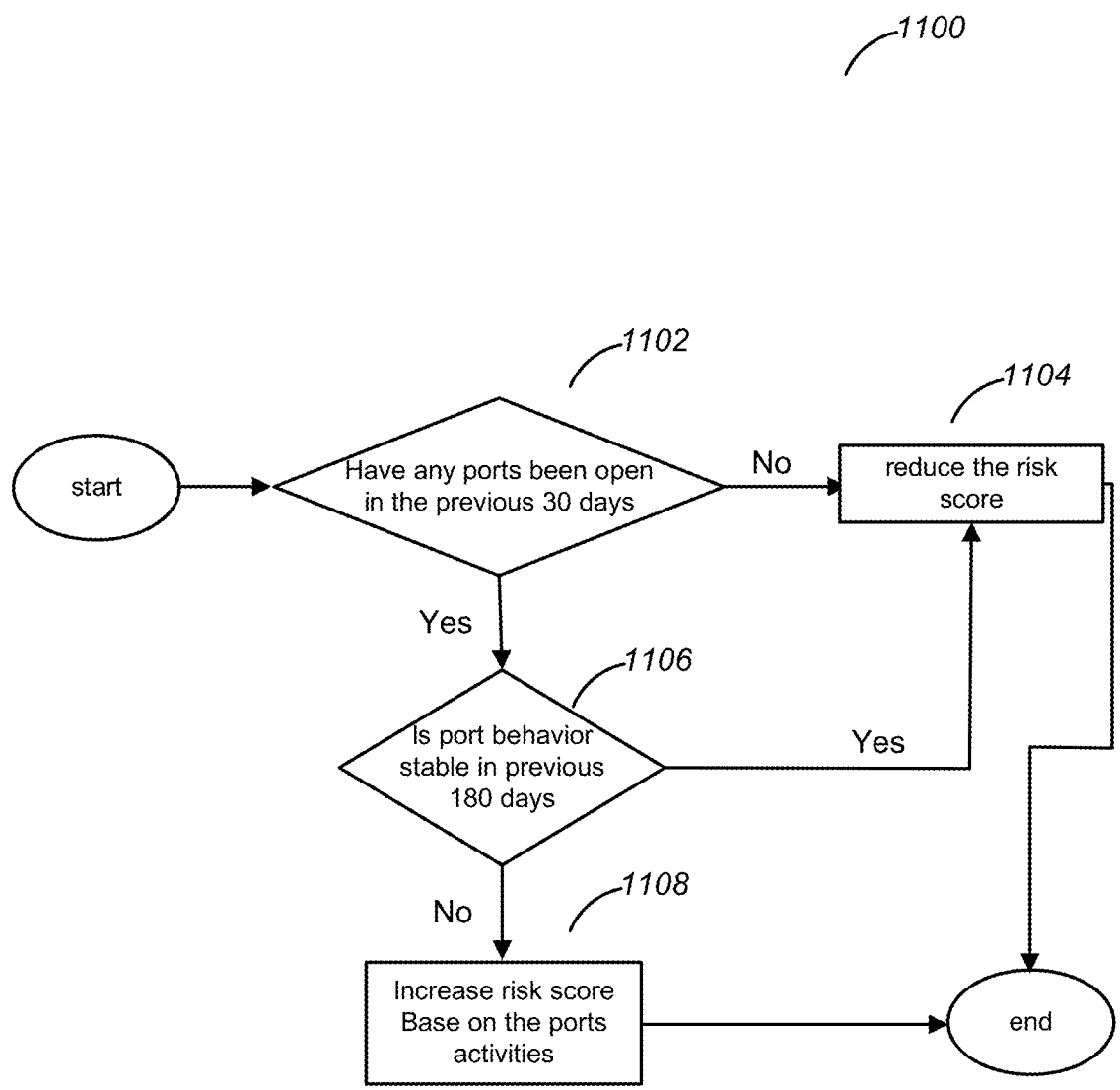
FIG. 11 illustrates exemplary actions for modifying risk scores, in accordance with some embodiments of this disclosure.

In some embodiments, FIG. 11 illustrates exemplary actions for modifying risk scores. Various metrics may be used to evaluate the risk of IOCs in different periods. Because each indicator changing over time, the systems and methods do not use static scores to evaluate the severity of indicators. For example, if IP address 125.25.129.202 was malicious in January, but has not shown much activity since February, the scoring system may drop the risk score of that IP address. The risk module may use weighted factors to calculate scores. Open port may be one of these factors to evaluate the maliciousness of indicators. Daily updated data enables generating time-based risk scores to help customers configure rules to block indicators and protect their systems.

At 1102, the risk module may determine whether there was an open port on the system or website associated with the indicator in the last thirty days. If none is found, the risk module, at 1104, reduces the severity score for the indicator (e.g., because it is usually hard to use uncommon ports to launch an attack). Otherwise, at 1106, the risk module checks whether the ports' behavior has been stable for longer time ranges (for example, 180 days). If all open ports are stable, the risk module at 1104 reduces the risk score. If the ports activities are suspicious, the risk module, at 1108, increases the risk score based on the exhibited stability of the port—the more frequently a port is opened and closed, the higher the threat.

Computing Machine Architecture

FIG. 12 is a block diagram illustrating components of an example machine able to read instructions from a machine-readable medium and execute them in a processor (or controller). Specifically, FIG. 12 shows a diagrammatic representation of a machine in the example form of a computer system 1200 within which program code (e.g., software) for causing the machine to perform any one or more of the methodologies discussed herein may be executed. The program code may be comprised of instructions 1224 executable by one or more processors 1202. In alternative embodiments, the machine operates as a stand-alone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 1224 (sequential or otherwise) that specify actions to be taken by that machine. Further, while only a single machine is illustrated, the term "machine" shall also be taken to include any collection of machines that individually or jointly execute instructions 1224 to perform any one or more of the methodologies discussed herein.

The example computer system 1200 includes a processor 1202 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 1204, and a static memory 1206, which are configured to communicate with each other via a bus 1208. The computer system 1200 may further include visual display interface 1210. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 1210 may include or may interface with a touch enabled screen. The computer system 1200 may also include alpha-numeric input device 1212 (e.g., a keyboard or touch screen keyboard), a cursor control device 1214 (e.g., a mouse, a trackball, a joystick, a motion sensor, or other pointing instrument), a storage unit 1216, a signal generation device 1218 (e.g., a speaker), and a network interface device 1220, which also are configured to communicate via the bus 1208.

The storage unit 1216 includes a machine-readable medium 1222 on which is stored instructions 1224 (e.g., software) embodying any one or more of the methodologies or functions described herein. The instructions 1224 (e.g., software) may also reside, completely or at least partially, within the main memory 1204 or within the processor 1202 (e.g., within a processor's cache memory) during execution thereof by the computer system 1200, the main memory 1204 and the processor 1202 also constituting machine-readable media. The instructions 1224 (e.g., software) may be transmitted or received over a network 1226 via the network interface device 1220.

While machine-readable medium 1222 is shown in an example embodiment to be a single medium, the term "machine-readable medium" should be taken to include a single medium or multiple media (e.g., a centralized or distributed database, or associated caches and servers) able to store instructions (e.g., instructions 1224). The term "machine-readable medium" shall also be taken to include any medium that is capable of storing instructions (e.g., instructions 1224) for execution by the machine and that cause the machine to perform any one or more of the methodologies disclosed herein. The term "machine-readable medium" includes, but not be limited to, data repositories in the form of solid-state memories, optical media, and magnetic media.

The computer system 1200 may execute (e.g., using hardware such as a processor(s), memory, and other suitable hardware) instructions associated with the modules described in FIG. 2 (e.g., data collection module 210, mapping module 220, aggregation module 230, detection module 240, tracking module 250, and risk calibration module 260).

Additional Configuration Considerations

Some advantages of the described approach include ability to quickly identify and track security breaches and display tracking results to enable a user to react to the breach. That is, received network data is mapped, aggregated, and transformed into tracking data that can be queries using a search engine for quick tracking results.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for tracking malicious activity through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:

detecting malicious activity associated with a first device connecting through a network to a second device, wherein the malicious activity was detected in association with a network port of the second device to which the first device connected;

responsive to detecting the malicious activity, retrieving an address for the first device;

transmitting, to a database, a request for network port data associated with the address, wherein the request comprises the address;

responsive to the request, receiving the network port data for the first device, wherein the network port data comprises data corresponding to the network port to which the first device connected;

determining, using the network port data and based on the address and the network port over which the first device connected, an earliest connection date of the first device to the network port of the second device; and providing an indication of the earliest connection date.

2. The method of claim 1, further comprising:

identifying other network ports to which the first device has connected, wherein one or more of the other network ports are not associated with the malicious activity;

determining a corresponding earliest connection date of the first device to each of the other network ports and setting the earliest connection date to a value corresponding to an earliest connection date of a network port of the other network ports.

3. The method of claim 1, further comprising:

receiving network connection data associated with a network-connected device, wherein the network data comprises a plurality of addresses for a plurality of devices connecting to the network-connected device and a plurality of network port identifiers corresponding to network ports over which the plurality of devices is connecting to the network-connected device; and generating a data structure for the network connection data, wherein the data structure comprises a plurality of entries, wherein each entry comprises an address field for storing an address for a connecting device, a date field for storing earliest connection dates, and a network port field for storing a network port identifier for a port over which the connected device connected.

4. The method of claim 3, further comprising:
identifying, within the data structure, entries where values in the address field and the date field match corresponding values in the address field and the date field of other entries; and
merging, into a plurality of network port aggregated entries, entries where both values in the address field and the date field match corresponding values in the address field and the date field of other entries, wherein one or more network port aggregated entries in the plurality of network port aggregated entries comprise the network port field that stores two or more network port values.

5. The method of claim 4, further comprising:
identifying, within the plurality of network port aggregated entries, network port aggregated entries where values in the address field match values in the address field of other network port aggregated entries;
merging, into a plurality of network port-date aggregated entries, the network port aggregated entries where values in the address field match corresponding values in the address field of the other network port aggregated entries, wherein one or more network port-date aggregated entries in the plurality of network port-date aggregated entries comprise a field with a plurality of dates and corresponding network port numbers for each date.

6. The method of claim 5, further comprising:
identifying, within each network port-date aggregated entry of the plurality of network port-date aggregated entries, one or more date ranges with corresponding multiple network ports; and
updating each network port-date aggregated entry to a format that maps one or more date ranges to one or more network ports.

7. The method of claim 1, further comprising:
receiving network port monitoring data for a network-connected device, wherein the network port monitoring data indicates open network ports at the network-connected device;
determining, based on the network port monitoring data, whether a network port of the network-connected device that is being accessed by a different network-connected device has been open for a threshold amount of time; and
based on determining that the network port of the network-connected device has not been open for the threshold amount of time, reducing a risk score associated with the different network-connected device.

8. The method of claim 7, further comprising, based on determining that the network port of the network-connected device has been open for the threshold amount of time:
determining whether the different network-connected device's behavior over the network port of the network-connected device that is being accessed by the different network-connected device has changed over a time period;
based on determining that the different network-connected device's behavior over the network port of the network-connected device that is being accessed by the different network-connected device has changed over the time period, increasing the risk score; and
based on determining that the different network-connected device's behavior over the network port of the network-connected device that is being accessed by the different network-connected device has not changed over the time period, refraining from increasing the risk score.

9. The method of claim 8, further comprising:
determining whether the risk score is above a risk threshold;
based on determining whether the risk score is above a risk threshold, detecting the malicious activity.

10. The method of claim 1, wherein detecting malicious activity associated with a first device connecting through a network to a second device comprises:
extracting, from the network port data a plurality of features, wherein the plurality of features comprises network port statistics; and
inputting the plurality of features into a binary classifier.

11. A non-transitory computer readable medium configured to store instructions, the instructions when executed by a processor cause the processor to:
detect malicious activity associated with a first device connecting through a network to a second device, wherein the malicious activity was detected in association with a network port of the second device to which the first device connected;
responsive to detecting the malicious activity, retrieving an address for the first device;
transmit, to a database, a request for network port data associated with the address, wherein the request comprises the address;
responsive to the request, receive the network port data for the first device, wherein the network port data comprises data corresponding to the network port to which the first device connected;
determine, using the network port data and based on the address and the network port over which the first device connected, an earliest connection date of the first device to the network port of the second device; and
provide an indication of the earliest connection date.

12. The non-transitory computer readable medium of claim 11, further comprising instructions that cause the processor to:
identify other network ports to which the first device has connected, wherein one or more of the other network ports are not associated with the malicious activity;
determine a corresponding earliest connection date of the first device to each of the other network ports and
set the earliest connection date to a value corresponding to an earliest connection date of a network port of the other network ports.

13. The non-transitory computer readable medium of claim 11, further comprising instructions that cause the processor to:
receive network connection data associated with a network-connected device, wherein the network data comprises a plurality of addresses for a plurality of devices connecting to the network-connected device and a plurality of network port identifiers corresponding to network ports over which the plurality of devices is connecting to the network-connected device; and
generate a data structure for the network connection data, wherein the data structure comprises a plurality of entries, wherein each entry comprises an address field for storing an address for a connecting device, a date field for storing earliest connection dates, and a network port field for storing a network port identifier for a port over which the connected device connected.

14. The non-transitory computer readable medium of claim 13, further comprising instructions that cause the processor to:
   identify, within the data structure, entries where values in the address field and the date field match corresponding values in the address field and the date field of other entries; and
   merge, into a plurality of network port aggregated entries, entries where both values in the address field and the date field match corresponding values in the address field and the date field of other entries, wherein one or more network port aggregated entries in the plurality of network port aggregated entries comprise the network port field that stores two or more network port values.

15. The non-transitory computer readable medium of claim 14, further comprising instructions that cause the processor to:
   identify, within the plurality of network port aggregated entries, network port aggregated entries where values in the address field match values in the address field of other network port aggregated entries;
   merge, into a plurality of network port-date aggregated entries, the network port aggregated entries where values in the address field match corresponding values in the address field of the other network port aggregated entries, wherein one or more network port-date aggregated entries in the plurality of network port-date aggregated entries comprise a field with a plurality of dates and corresponding network port numbers for each date.

16. The non-transitory computer readable medium of claim 15, further comprising instructions that cause the processor to:
   identify, within each network port-date aggregated entry of the plurality of network port-date aggregated entries, one or more date ranges with corresponding multiple network ports; and
   update each network port-date aggregated entry to a format that maps one or more date ranges to one or more network ports.

17. The non-transitory computer readable medium of claim 11, further comprising instructions that cause the processor to:
   receive network port monitoring data for a network-connected device, wherein the network port monitoring data indicates open network ports at the network-connected device;
   determine, based on the network port monitoring data, whether a network port of the network-connected device that is being accessed by a different network-connected device has been open for a threshold amount of time; and
   based on determining that the network port of the network-connected device has not been open for the threshold amount of time, reduce a risk score associated with the different network-connected device.

18. The non-transitory computer readable medium of claim 17, further comprising instructions that cause the processor to, based on determining that the network port of the network-connected device has been open for the threshold amount of time:
   determine whether the different network-connected device's behavior over the network port of the network-connected device that is being accessed by the different network-connected device has changed over a time period;
   based on determining that the different network-connected device's behavior over the network port of the network-connected device that is being accessed by the different network-connected device has changed over the time period, increase the risk score; and
   based on determining that the different network-connected device's behavior over the network port of the network-connected device that is being accessed by the different network-connected device has not changed over the time period, refrain from increasing the risk score.

19. The non-transitory computer readable medium of claim 18, further comprising instructions that cause the processor to:
   determine whether the risk score is above a risk threshold;
   based on determining whether the risk score is above a risk threshold, detect the malicious activity.

20. The non-transitory computer readable medium of claim 11, wherein detecting malicious activity associated with a first device connecting through a network to a second device comprises:
   transforming the network port data into timeseries data, wherein the timeseries data comprises network port connection data for each of a plurality of time periods, and wherein each time period of the plurality of time periods is associated with a value indicating whether the first device was connected to the second device during a corresponding time period of the plurality of time periods; and
   inputting the timeseries data into a binary classifier.

* * * * *